US00RE37657E

(19) United States
(12) Reissued Patent
Lucas

(10) Patent Number: US RE37,657 E
(45) Date of Reissued Patent: Apr. 16, 2002

(54) SUPPORT OR PRESSURE ROLL FOR A PAPER ROLL WINDER

(75) Inventor: Robert G. Lucas, Pittsfield, MA (US)

(73) Assignee: Beloit Technologies, Inc., Wilmington, DE (US)

(21) Appl. No.: 09/145,915

(22) Filed: Sep. 2, 1998

Related U.S. Patent Documents

Reissue of:
(64) Patent No.: 5,553,806
Issued: Sep. 10, 1996
Appl. No.: 08/246,898
Filed: May 19, 1994

(51) Int. Cl.[7] ..... B65H 18/26
(52) U.S. Cl. ..... 242/542.4; 242/547; 492/33; 492/35; 492/36; 492/48; 492/56
(58) Field of Search ..... 492/33, 35, 36, 492/48, 56; 242/542.4, 547, 541.5, 541.6

(56) References Cited

U.S. PATENT DOCUMENTS

| | | | | |
|---|---|---|---|---|
| 1,867,550 A | | 7/1932 | Cameron et al. | 242/548 |
| 2,529,286 A | | 7/1950 | Fraser | 492/35 X |
| 2,863,175 A | | 12/1958 | Meyer | 19/143 |
| 2,980,356 A | | 5/1961 | Beese et al. | 242/523 |
| 3,080,014 A | | 3/1963 | Dahl | 181/33 |
| 3,098,619 A | | 7/1963 | Washburn | 242/541.3 |
| 3,198,696 A | | 8/1965 | Justus | 162/360 |
| 3,349,693 A | | 10/1967 | Mitchell, Jr. | 100/90 |
| 3,503,567 A | | 3/1970 | Casey | 242/67.1 |
| 3,514,829 A | | 6/1970 | Blatt | 492/56 |
| 3,599,306 A | * | 8/1971 | Brafford | 29/132 |
| 3,702,687 A | | 11/1972 | Hall | 242/542.4 |
| 3,714,693 A | | 2/1973 | Peterson | 492/48 X |
| 3,945,723 A | | 3/1976 | Cook et al. | 492/56 X |
| 4,026,487 A | | 5/1977 | Ales, Jr. | 242/65 |
| 4,149,797 A | | 4/1979 | Imperial | 492/56 X |
| 4,193,559 A | | 3/1980 | Ballard | 242/547 |
| 4,353,296 A | | 10/1982 | Beucker | 100/121 |
| 4,586,224 A | | 5/1986 | Sartor et al. | 492/35 X |
| 4,880,501 A | | 11/1989 | Schiel | 162/358 |
| 4,887,340 A | | 12/1989 | Kato et al. | 492/56 X |
| 4,934,622 A | | 6/1990 | Hakiel | 242/610.4 X |
| 5,071,083 A | | 12/1991 | Tubota et al. | 492/35 X |
| 5,240,198 A | | 8/1993 | Dorfel | 242/542.4 |
| 5,335,871 A | | 8/1994 | Fissmann et al. | 242/542.4 X |
| 5,431,358 A | | 7/1995 | Alexander, III | 242/542.4 |

FOREIGN PATENT DOCUMENTS

| | | |
|---|---|---|
| DE | 33 02 843 A1 | 1/1983 |
| DE | 87 17 259.3 | 6/1987 |
| DE | 94 20 003.3 | 4/1994 |
| EP | 0 294 546 A3 | 3/1988 |
| EP | 0 521 681 A1 | 6/1992 |
| GB | 417769 | 10/1934 |
| JP | 60-173542 | 11/1985 |
| JP | 61-75463 | 5/1986 |
| JP | 62-63248 | 4/1987 |
| JP | 62-211679 | 9/1987 |
| JP | 2-127337 | 5/1990 |
| JP | 5-193792 | 8/1993 |
| JP | 6-115771 | 4/1994 |

* cited by examiner

*Primary Examiner*—Donald P. Walsh
*Assistant Examiner*—William A. Rivera

(57) ABSTRACT

A roll for selective use as either a support drum or as a rider roll in a winder for winding a traveling paper web into a relatively large diameter wound web roll has a body with an outer, elastomeric cover. The elastomeric cover includes a pattern, open to the surface, arranged such that the percent of volumetric void for a unit of cover volume is such that the effective hardness of the cover ranges between about 30 Shore "A" to about 55 Shore "A" where the roll is a support drum, and between about 40 Shore "A" to about 65 Shore "A" when the roll is a rider roll. In addition, the elastomeric material has an absolute hardness of about 65 Shore "A", or less, for a support drum, and about 75 Shore "A", or less, for a rider roll, and a Poisson's ratio of between about 0.47 to about 0.499.

11 Claims, 3 Drawing Sheets

SUPPORT OR PRESSURE ROLL FOR A PAPER ROLL WINDER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the winding of a traveling paper web, such as is produced by a papermaking machine. More particularly, this invention relates to the construction of either a support drum or a rider roll, or both, for use in a winder for winding such a traveling paper web. Still more particularly, this invention relates to the construction of a support drum or rider roll having an elastomeric cover having a unique combination of Poisson's ratio, absolute hardness and effective hardness to provide a relatively soft nip in support of the wound paper roll while utilizing a relatively hard elastomeric cover.

2. Description of the Prior Art

In the papermaking industry, a common form of winder for winding the substantially endless paper web produced by the papermaking machine comprises a pair of spaced, parallel support drums for supporting the wound paper roll being wound from the traveling paper web.

It is known in the papermaking industry to have winder support drums with grooves to permit the paper roll being wound to be turned with the purpose of encouraging less slippage between it and the support drum. Also, such grooves may provide a means to reduce any boundary layer air film between the drum and the paper roll. Such grooves can take several forms, such as, for example, spiral grooves, Chevron, or herringbone patterned.

It has also been contemplated to cover the support drums with an elastomeric material, such as rubber, in an attempt to provide a larger support area for the increasingly heavy wound paper roll on the cylindrical surface of the support drum. Some of such rubber covered drums have also been grooved. Examples of prior art types of grooving and support drum covers are shown in U.S. Pat. Nos. 1,867,550; 3,098,619; 4,541,585 and British Patent No. 417,769. While the prior art includes roll and support drums having elastomeric covers, the practice heretofore in the papermaking industry was to construct these covers with a hardness of 85 Shore "A", or greater; only rarely have covers had a hardness as soft as 75 Shore "A". On the Shore "A" scale, readings approaching 100 are relatively hard, and readings approaching 25 are relatively soft.

Grooved winder drums, grooved elastomeric covered winder drums and elastomeric covered winder drums all have some operational advantages and efficiencies which are generally associated with their ability to better support the paper roll being wound with less slippage, less internal stress, and more control of the winding process and desired parameters. This is particularly true during periods when the rotational speed of the wound paper roll is changing. However, such prior configurations also had inherent deficiencies.

If the non-grooved elastomeric material was too hard, it essentially operated like a solid metallic support drum, which negated any advantage, such as a larger support area, that an elastomeric cover provides. Softer elastomeric covers, which might provide such a larger wound web roll support area, were not believed to be economically or operationally viable.

Therefore, while fundamental configurations, such as providing support drums with elastomeric covers and grooving such drums, have long been known, there has been a long-felt need for a paper winder support drum having a grooved elastomeric cover which provides a relatively softer, wider nip and relatively long service during operation.

SUMMARY OF THE INVENTION

The problems, deficiencies and inefficiencies associated with prior art types of winder support drums having elastomeric covers have been obviated by this invention. In the winder support drum of this invention, an elastomeric cover is provided which has a unique combination of physical parameters and properties which enable it to operate continuously while supporting a wound paper roll on its grooved elastomeric surface. These properties include a Poisson's ratio for the elastomeric material of about 0.47–0.499; an absolute hardness of the elastomeric material of about 65 Shore "A", or less, for support drums; an absolute hardness of about 75 Shore "A", or less, for rider rolls; and a surface pattern in the elastomeric cover which is so arranged that the percent of volumetric void for a unit volume of the cover is such that the effective hardness of the cover is much less than the intrinsic hardness of the cover. The absolute hardness range for rider roll elastomeric covers is somewhat higher on the Shore "A" scale (i.e. harder) due to the higher nip cycle frequency of the rider rolls which is a function of the differences in roll diameters between support drums and rider rolls (support drums have larger diameters).

The groove pattern in the cover surface need not have any particular configuration. While a dimpled surface pattern on the elastomeric cover is functionally superior, a diamond-shaped pattern or a tight spiral groove pattern is preferred. A symmetrical diamond pattern minimizes roll steering and thrusting forces. A tight spiral groove pattern minimizes noise and is more economical to make.

A cover having a plurality of individual circular impressions, each extending ring-like about the circumference of the roll, is not preferred due to the likelihood that the superpositioning of a similarly depressed layers will result in a very unattractive ridge pattern on the surface of the wound web roll.

These characteristics of the winder support drum construction enable the instant center associated with the nip between the wound paper roll and the support drum to be shifted from inside the wound paper roll to inside the elastomeric cover of the support drum. This combination of physical parameters and characteristics of the support drum also result in an effectively much softer cover, which is desirable from a standpoint of lowering the unit pressure on the support drum surface, while providing the durability and longevity of a much harder cover.

It is contemplated that the absolute and effective hardnesses of rolls used as support drums in a two-drum type of winder do not both have to be the same. Thus, it is contemplated that the effective hardness of the back drum cover, commonly referred to as the number one drum in the papermaking industry, might be harder than the effective hardness of the cover on the front drum (number two drum).

The principles of this invention can also be applied to the rider roll in a winder for winding a wound paper web roll. Therefore, in this description, the covers described can refer to either a support drum or a rider roll which are intended to be referred to by the generic term "roll" in this description.

Accordingly, it is an object of this invention to provide an improved support drum or rider roll for a winder for winding a traveling paper web into a wound roll.

Another object of this invention is to provide an improved winder support drum or rider roll having an elastomeric cover.

Still another object of this invention is to provide an improved winder support drum or rider roll having an elastomeric cover with an open pattern in its surface.

Yet another object of this invention is to provide paper web winding apparatus for reducing interlayer shear stress between layers of the web in the wound web roll.

An advantage of this invention is a winder support drum or rider roll having an elastomeric cover which has an absolute hardness which is relatively high, and an effective hardness which is relatively low.

A feature of this invention is an elastomeric covered winder drum where the elastomer has a Poisson's ratio of about 0.47 to about 0.499 and an effective hardness of about 55 Shore "A", or less.

A feature of this invention is an elastomeric covered rider roll where the elastomer has a Poisson's ratio of about 0.47 to about 0.499 and an effective hardness of about 65 Shore "A", or less.

These, and other objects, features and advantages of this invention will be readily apparent to those skilled in the art when the description of the preferred embodiments is read in conjunction with the attached drawings.

BRIEF DESCRIPTION OF THE DRAWINGS

FIG. 7 is a plan view of a longitudinal section of a grooved elastomeric covered support drum of this invention.

DESCRIPTION OF THE PREFERRED EMBODIMENTS

Figure 1:
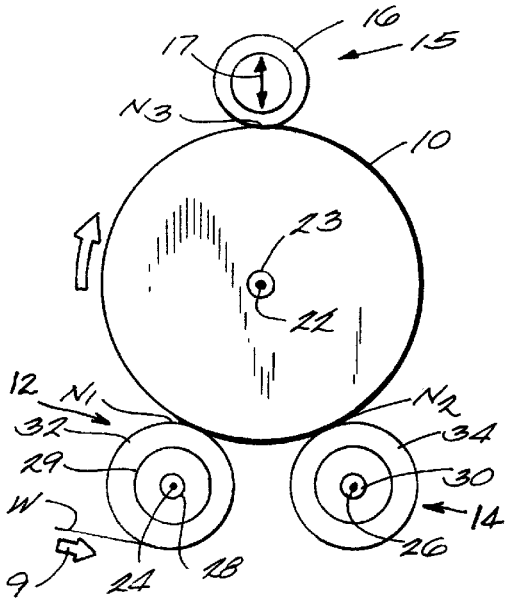
FIG. 1 is a side-elevational view, in somewhat schematic form, of a two-drum winder where the support drums, and possibly the rider roll also, have an elastomeric cover in accordance with this invention.

As shown in FIG. 1, a traveling paper web W, moving in the direction of arrow 9, is being wound into a wound paper roll 10 while being supported by a pair of horizontally arrayed, parallel, spaced support drums which are generally designated with the numerals 12, 14. A rider roll 15 is disposed for substantially vertical movement, indicated by arrow 17, while maintaining nipping contact at $N_3$ with the wound paper roll. The wound paper roll is supported on the two winder support drums along their respective nip lines of contact $N_1$,$N_2$, respectively.

In this description, where convenient, corresponding, or similar, components will be similarly designated with different suffixes used to distinguish between them.

Figure 2:
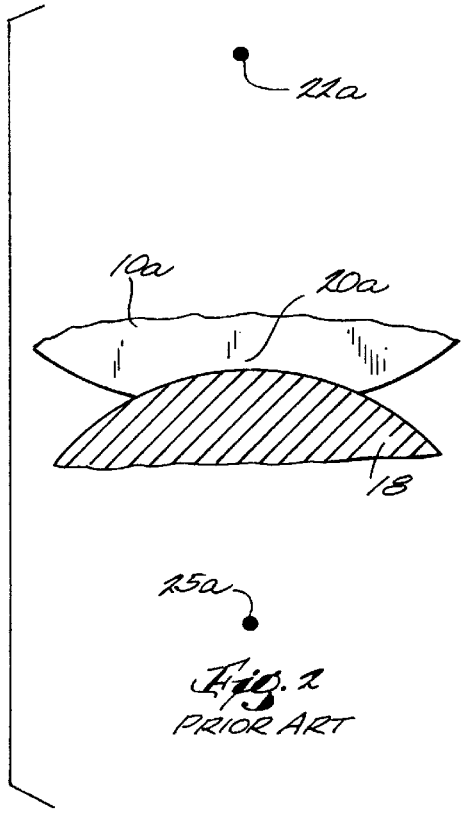
Fig. 2 PRIOR ART
FIG. 2 is a side-elevational view, in somewhat schematic form, showing a prior art steel winder drum configuration where the wound paper roll supported on the winder support drum is deformed.

The wound paper roll, although relatively hard, is not as hard as, for example, a solid steel winder drum. Thus, a representation of a wound paper roll 10 having a center shaft 23 supported on an ordinary steel winder support drum 18 could be as shown in FIG. 2 where the relatively harder steel support drum indents, and deforms, the outer layers of the wound paper roll 10a. In all instances where there is deformation of one roll, such as the paper roll in FIG. 2, which is rotatably supported on a relatively harder roll, such as a steel drum, there is a so-called instant center created, which is designated 20a in FIG. 2, located within the wound web roll, about which the outer layers of paper can be said to effectively rotate relative to the body of the wound web roll along the instant center which lies in a plane between the actual axes of rotation 22a, 25a of the wound paper roll 10a and steel support drum 18, respectively, without moving relative to the surface of the steel support drum. In FIG. 2, these actual centers of rotation 22a, 25a are not shown to scale relative to the diameters of the respective rolls to facilitate their illustration.

Figure 3:
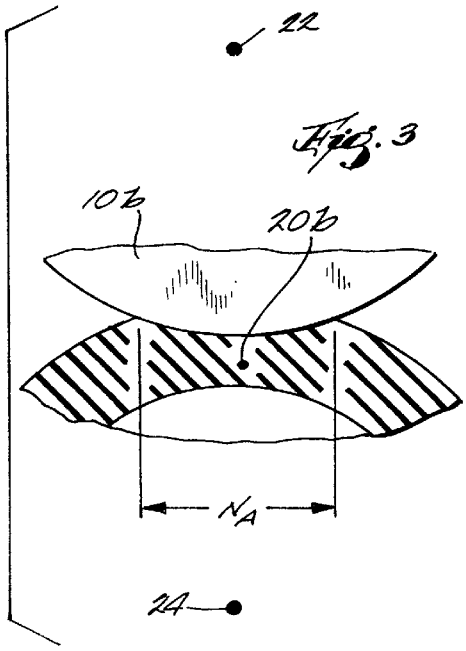
FIG. 3 is a side-elevational view, in somewhat schematic form, showing a wound paper roll supported by a patterned surfaced elastomeric covered support drum in accordance with the principles of this invention.
Figure 4:
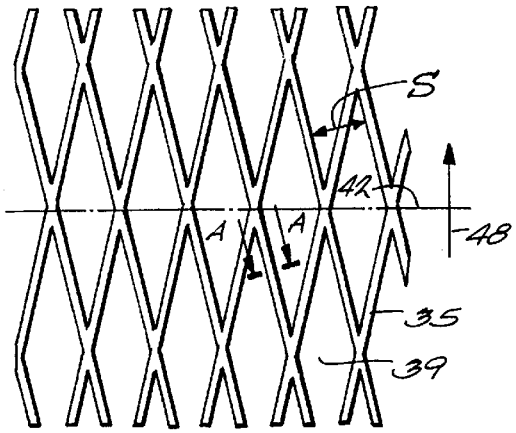

In the winder support drum of this invention, as shown in FIGS. 1 and 3, each support drum 12, 14 has an elastomeric cover 32, 34, respectively, which is effectively relatively softer than the wound paper roll 10 it supports in the winder during the paper roll winding process. Each support drum also has a center shaft 28, 30 and a drum body 29, 31, which rotate about their longitudinal axes 24, 26, respectively. Since the elastomeric covers 32 (34)is (are) effectively relatively softer than the wound paper roll, the instant center of the nip is located at 20b, which is within the elastomeric cover. The further the instant center is within the elastomeric cover, the less the interlayer shear stress between layers and the less potential for layer to layer relative motion.

The use of a relatively soft elastomer, which may be in the form of a foam, for example, would provide for an exceptionally wide nip area of contact $N_A$ (FIG. 3), but there would also be a concomitant large amount of cyclical radial movement of the cover as it deforms in the nip and is released upon the movement of the wound paper roll off the nip with the support drum. This produces mechanical working of the grooved, solid or foam elastomer, which will cause it to mildly warm-up. If mechanical working of the cover is extreme, it will heat up to a deleteriously high temperature, or, in the case of foam, to fracture and break down along the air voids within the cover, or both. Both of these conditions are very undesirable in a winder support drum since they contribute to the relatively quick destruction of the roll cover. Therefore, one of the important criteria in the selection of the elastomeric cover material is that it should not heat up excessively so as to deleteriously affect its structural composition during operation.

On the other hand, if the elastomeric cover is made quite hard, such as having an absolute hardness of about 85 Shore "A", or harder (i.e. a higher Shore number), then its operational characteristics are relatively similar to those of a steel drum. That is, the nip area $N_A$ is quite narrow, even approaching line contact, which provides neither a relatively large, nor soft, nip contact. Therefore, while a steel drum operates with some degree of satisfactory performance, at least to the extent that its operational life is long, it inherently operates with a relatively narrow nip having relatively high intensity which produces stress in the paper sheet being wound with attendant deficiencies in the wound paper roll, such as core bursts, tension bursts and air sheer bursts to name three.

The function of this invention is that the undesirable stress and relative movement between contiguous layers of the paper web will be reduced, particularly as the diameter of the wound paper roll grows larger, by softening the nip between the wound paper roll and the support drums. Such softening essentially can occur when the area of the nip is either larger than the area of the nip between the wound paper roll and a steel support drum, or when the area of the support nip becomes larger as the diameter, and weight, of the wound paper roll becomes larger.

In this invention, the nip area of contact between the wound paper roll and a support drum is made larger by providing an elastomeric roll cover which has a relatively high absolute hardness, but which has a relatively softer effective hardness so as to provide an appropriate reduction of deformation in its support nip with the wound web roll. Since elastomers, such as rubber compounds, are almost incompressible volumetrically, there must be deformation in order for the nip to become larger in area. This deformation and enlargement of the nip area of contact is produced by a unique combination of a relatively hard elastomer, having an absolute hardness of about 65 Shore "A", or less, for support drums (75 Shore "A", or less, for rider rolls); the elastomer having a Poisson's ratio of between about 0.47 and about 0.499; and a pattern in the surface of the elastomeric roll cover, which is open to the outer surface of the roll cover, which combine to provide a roll cover having an effective hardness much lower than that of the base material.

In this discussion, the term "absolute hardness" refers to the hardness of a pure, solid sample of an elastomeric compound, such as rubber. A winder support drum having a cylindrical cover made of the pure, solid elastomeric compound with no surface pattern in the cover, and being of a certain thickness and used to support a wound web roll of a given diameter and weight, would produce a nip $N_A$ of a certain width in the elastomeric cover.

The term "effective hardness" is the hardness of a winder support drum of the same size having a cover made of the same pure, solid elastomeric compound, but which has a pattern, open to the surface of the cover, and, when supporting the same wound paper roll having the same diameter and weight, produces a nip $N_A$ which is wider than the nip produced in the pure, solid elastomeric compound cover which does not have a surface pattern in it. The wider nip $N_A$ connotes a softer nip and, therefore, the "effective hardness" is less hard than the "absolute hardness".

Figure 4:
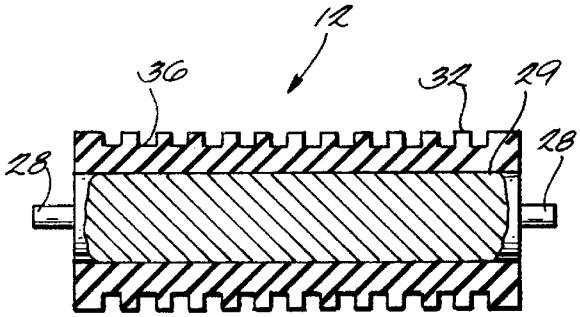
FIG. 4 is a plan view of an elastomeric cover for either a support drum or rider roll of this invention which has a diamond-shaped pattern.
Figure 6:
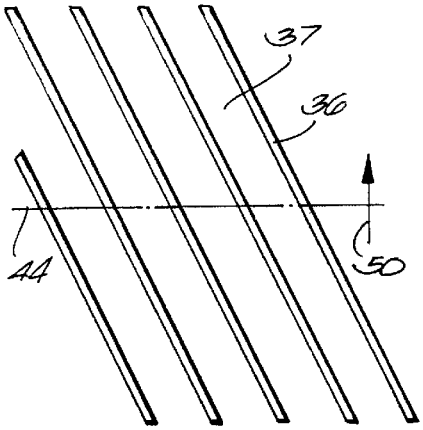
FIG. 6 is a plan view of an elastomeric cover for this invention which has a grooved pattern.

Therefore, the pure, solid elastomeric compound, which has an absolute hardness of about 65 Shore "A", for example, for a winder drum (about 75 Shore "A", for example, for a rider roll) and having a Poisson's ratio of about 0.47 to 0.499, for example, might then have a relatively softer, effective hardness of about 55 Shore "A", for example, when the support drum cover was grooved with a series of grooves (an effective hardness of about 65 Shore "A" for a grooved rider roll cover), such as shown in FIGS. 4 or 6, for example. The volumetric void of the groove in a unit volume of the elastomeric material comprising the cover, in combination with a specified range of Poisson's ratio, changes the absolute stiffness (or spring constant) of the nip into a much lower stiffness nip consistent with an ungrooved cover of a much softer elastomeric compound. This enables a relatively hard elastomeric compound to be used for the cover material which provides the durability and long life of a metal surfaced support drum while simultaneously providing a relatively softer, effective hardness and nip which permits the paper roll being wound to have less stress and wound-in tension so as to provide fewer defects in the wound paper roll.

The preferred range of effective hardness for the elastomeric cover on a support drum is between about 30 Shore "A" and about 55 Shore "A".

The preferred range of effective hardness for the elastomeric cover on a rider roll is between about 40 Shore "A" and about 65 Shore "A".

Therefore, the shape of the surface pattern in the elastomeric cover of the support drum and rider roll is only important to the extent that its percent of volumetric void in a unit volume of the cover is such as to provide the desired effective hardness of the roll cover.

With regard to the term "nip", theoretically, if two absolutely hard, cylindrical support drums having infinitely small diameters are brought into nipping engagement, the nip approaches the shape of a straight line having no width. Of course, this is impossible in real machinery, so the nip is actually an area, such as shown in FIG. 3 as $N_A$. Accordingly, a relatively softer nip has a relatively wider nip $N_A$.

Figure 5:
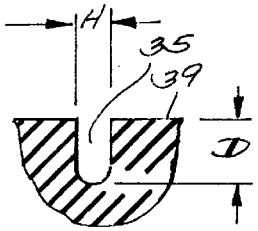
FIG. 5 is a cross-sectional view through section "A"—"A" in FIG. 4 which shows the volumetric void of a groove in the elastomeric cover.

Examples of some contemplated surface patterns are shown in FIGS. 4, 5, 6 and 8. FIG. 5 shows a cross-sectional view of one of the grooves 35 between the land areas 39 forming the diamond pattern shown in FIG. 4. The volume of the groove for a specific length is, therefore, the product of the groove width H times the groove depth D times a unit length, or l. Thus, the percent of volumetric void for a unit volume of the roll cover would be the volume of the void of the groove for a unit length divided by the total volume of a unit length, width and depth of roll cover, including the volume of the groove.

It should be noted that care must be given to the selection of the aspect ratio of the groove pattern. The aspect ratio is the groove depth divided by the land width between adjacent grooves. If the aspect ratio is too high, then the material between the grooves becomes elastically unstable. The land column between adjacent grooves behaves like a short column in a buckling mode. Thus, groove pattern design seeks to maximize the aspect ratio.

Figure 8:
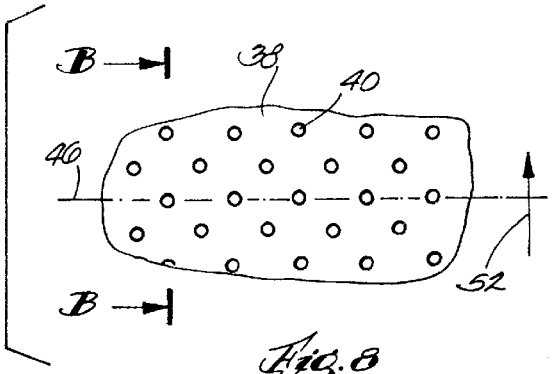
FIG. 8 is a plan view, in somewhat schematic form, of the elastomeric cover showing a dimpled pattern in the elastomeric surface of a support drum or rider roll.

The same analysis could be made with regard to the grooves 36 between the land areas 37 in the roll cover shown in FIG. 6 and with the interstices 38 which are formed between the raised dimples 40 which form the outer peripheral surface of the roll cover shown in FIG. 8. In each of the roll covers shown in FIGS. 4, 6 and 8, the direction of support drum, or rider roll, rotation about their longitudinal axes 42, 44 and 46, is shown by directional arrows 48, 50 and 52, respectively.

FIG. 7 illustrates a grooved cover, such as the circumferentially extending grooves 36 shown in FIG. 6, in the elastomeric cover which is formed over the cylindrical support drum body 29 which, in turn, is mounted in the winder apparatus, such as a bearing housing, to rotate about its arbor shafts 28 at either end thereof in a manner well-known to those in the papermaking industry.

Figure 9:
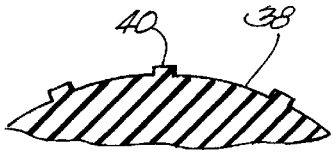
FIG. 9 is a cross-sectional view through section "B"—"B" in FIG. 8, which shows the profile of some of the dimples in the cover.
Figure 10:
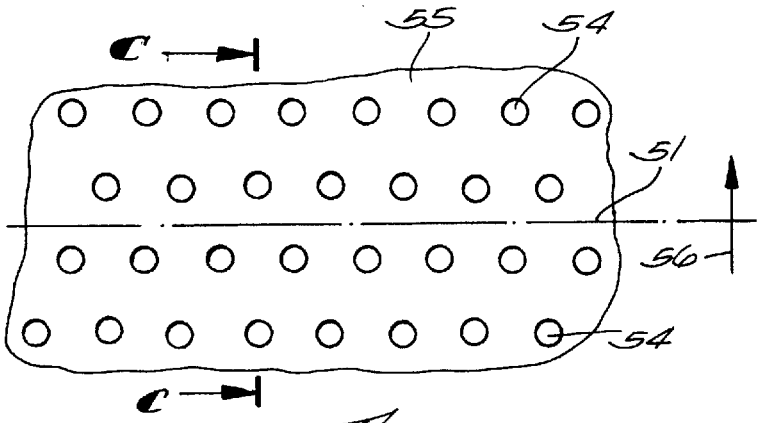
FIG. 10 is a plan view, in somewhat schematic form, of the elastomeric cover showing a recessed hole pattern in the elastomeric surface of a support drum or rider roll.
Figure 11:
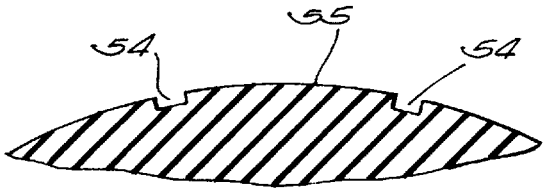
FIG. 11 is a cross-sectional view through section "C"—"C" in FIG. 10, which shows the profile of some of the recessed holes in the cover.

The embodiment of a cover pattern shown in FIGS. 10 and 11 is analogous to that shown in FIGS. 8 and 9 except that in the embodiment shown in FIGS. 10 and 11, the cover pattern comprises a series of inwardly extending holes 54 uniformly sized and arrayed in the elastomeric surface 55 of the rider roll or support drum. Arrow 56 shows the direction of drum/roll rotation.

Figure 12:
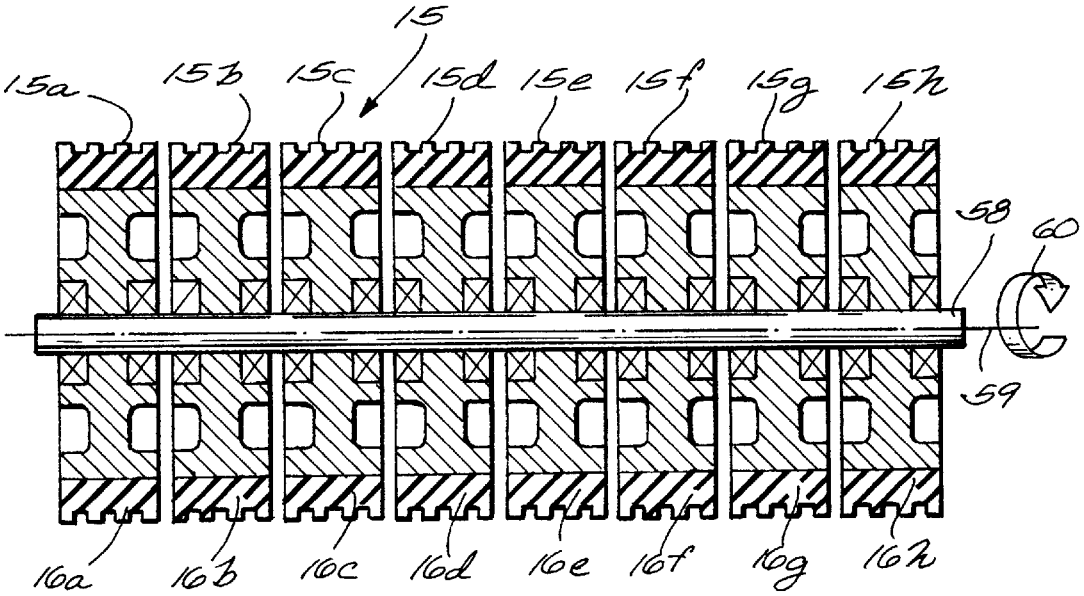
FIG. 12 is a plan view of a longitudinal section of a rider roll which comprises a plurality of individual roller elements which have elastomeric covers constructed in accordance with the principles of this invention.

In FIG. 12, a segmented rider roll 15 is shown which incorporates the principles of the invention. All of the cover compositions and patterns previously described and shown in any of the Figures can be utilized on or in the elastomeric cover 16a, 16b, 16c of the rider roll, which comprises individually rotatable roller elements 15a, 15b, 15c, etc. While the roller elements are shown mounted on the same shaft or body member 58, having a longitudinal axis 59, for simplicity, they can be mounted to a corresponding plurality of individual, axially aligned shafts to permit them to move independent translationally relative to the paper web roll being wound. Arrow 60 shows the direction of rotation.

For example, a typical groove, as shown in FIG. 5, could have a width H of about 0.60 inches, a depth D of about 0.10 inches for a rubber support drum cover having an absolute hardness of about 65 Shore "A", or less, with the grooves, such as shown in FIG. 4, extending at an angle of about 30 degrees to the axis 42 of rotation. The spacing S between adjacent, parallel grooves would be about 0.43 inches.

Similarly, for example, a typical groove for a rider roll, as shown in FIG. 5, could have a width H of about 0.60 inches, a depth D of about 0.10 inches for a rubber rider roll cover having an absolute hardness of about 75 Shore "A", or less, with the grooves, such as shown in FIG. 4, extending at an angle of about 30 degrees to the axis 42 of rotation. The spacing S between adjacent, parallel grooves would be about 0.43 inches.

While an almost infinite variety of elastomers are known, many of which would provide acceptable results, it has been found that roll covers made of polyurethane and rubber compounds have provided a preferred demonstration of the principles and concepts disclosed. These compounds are recited by way of example only and are not intended to limit the disclosure and scope of the invention, which is defined solely by the claims.

Thus, an improved paper winder support drum and rider roll (here collectively referred to as rolls) have been disclosed which utilize an elastomeric cover having a relatively high hardness to provide an effectively relatively soft cover, and relatively soft, or wider, support nip with a paper roll being wound and supported by the support drum, and/or nipped with a rider roll, wherein the instant center of the paper web being wound is shifted to a location within the circumference of the support drum to achieve the stated objects and exhibit the stated features and advantages.

What is claimed is:

1. A roll for use in a winder for a papermaking machine as a support drum for winding a traveling paper web into a wound web roll by maintaining supporting nip engagement therewith, the support drum comprising, in combination:

a shaft body member having an outer surface and a longitudinal axis;

a cover on the outer surface of the body member, the cover having an outer surface defining the cylindrical shape and surface of the support drum and comprising an elastomeric material having a Poisson's ratio of about 0.47, or greater, and an absolute hardness of about 65 Shore "A", or less;

a pattern in the outer surface of the cover, the cover having a volumetric void open to the outer surface thereof and intermediate the pattern, the pattern arranged such that the percent of the volumetric void for a unit volume of an outer portion of the cover which includes the volumetric void and the pattern is such that the cover has an effective hardness of about 55 Shore "A", or less;

whereby a nip instant center is created which is within the [wound web roll] *cover*.

2. A roll for use in a winder as set forth in claim 1, wherein: the Poisson's ratio of the elastomeric material ranges from about 0.47 to about 0.499.

3. A support drum roll for use in a winder as set forth in claim 1, wherein:

the percent of the volumetric void for a unit volume of the cover, as defined in claim 1, is such that the effective hardness of the cover ranges from between about 30 Shore "A" to about 55 Shore "A".

4. A support drum roll for use in a winder as set forth in claim 1, wherein:

the Poisson's ratio of the elastomeric material ranges from about 0.47 to about 0.499;

the percent of the volumetric void for a unit volume of the cover, as defined in claim 1, is such that the effective hardness of the cover ranges from between about 30 Shore "A" to about 55 Shore "A".

5. A roll for use in a winder as set forth in claim 1, wherein: the pattern in the cover includes a plurality of grooves.

6. A roll for use in a winder as set forth in claim 1, wherein: the pattern in the cover is diamond shaped.

7. A roll for use in a winder as set forth in claim 1, wherein: the pattern in the cover includes a plurality of raised dimples.

8. A roll for use in a winder as set forth in claim 1, wherein: the pattern in the cover includes a plurality of recessed holes.

9. A roll for use in a winder for a papermaking machine as a rider roll to apply a pressure nip to a web roll being wound in the winder from a traveling paper web, the rider roll comprising, in combination:

a shaft body member having an outer surface and a longitudinal axis;

a cover on the outer surface of the body member, the cover having an outer surface defining the cylindrical shape and surface of the rider roll and comprising an elastomeric material having a Poisson's ratio of about 0.47, or greater, and an absolute hardness of about 75 Shore "A", or less;

a pattern in the outer surface of the cover, the cover having a volumetric void, the pattern arranged such that the percent of the volumetric void for a unit volume of an outer portion of the cover which includes the volumetric void and the pattern is such that the cover has an effective hardness of about 65 Shore "A", or less;

whereby an instant center is created which is within the [wound web roll] *cover*.

10. A rider roll for use in a winder as set forth in claim 9, wherein:

the percent of the volumetric void for a unit volume of the cover, as defined in claim 9, is such that the effective hardness of the cover ranges from between about 40 Shore "A" to about 65 Shore "A".

11. A rider roll for use in a winder as set forth in claim 9, wherein:

the Poisson's ratio of the elastomeric material ranges from about 0.47 to about 0.499;

the percent of the volumetric void for a unit volume of the cover, as defined in claim 9, is such that the effective hardness of the cover ranges from between about 40 Shore "A" to about 65 Shore "A".

* * * * *